US012810713B1

(12) United States Patent
Chen

(10) Patent No.: US 12,810,713 B1
(45) Date of Patent: Nov. 24, 2026

(54) ARTIFICIAL INTELLIGENCE-BASED BABY MONITOR

(71) Applicant: Chi-Hsiu Chen, New Taipei City (TW)

(72) Inventor: Chi-Hsiu Chen, New Taipei City (TW)

(*) Notice: Subject to any disclaimer, the term of this patent is extended or adjusted under 35 U.S.C. 154(b) by 0 days.

(21) Appl. No.: 19/257,441

(22) Filed: Jul. 1, 2025

(51) Int. Cl.
*G08B 21/02* (2006.01)
*G08B 21/04* (2006.01)
*H04N 23/56* (2023.01)

(52) U.S. Cl.
CPC ...... *G08B 21/0208* (2013.01); *G08B 21/0211* (2013.01); *G08B 21/0407* (2013.01); *H04N 23/56* (2023.01)

(58) Field of Classification Search
CPC ............ G08B 21/0208; G08B 21/0211; G08B 21/0407; H04N 23/56
USPC ........................................................ 340/573.1
See application file for complete search history.

(56) References Cited

U.S. PATENT DOCUMENTS

2016/0105644 A1* 4/2016 Smith .............. G08B 13/19667 348/159
2019/0279481 A1* 9/2019 Silberschatz ...... G08B 21/0208
2020/0177848 A1* 6/2020 Arizti ....................... G01P 15/08
2022/0015648 A1* 1/2022 Zinner ................. A61B 5/0022
2022/0238000 A1* 7/2022 Chan ....................... H04N 7/185
2025/0246059 A1* 7/2025 Lamm .................. A61B 5/0002

* cited by examiner

*Primary Examiner* — Kerri L Mcnally
(74) *Attorney, Agent, or Firm* — Leong C. Lei

(57) ABSTRACT

The artificial intelligence-based baby monitor includes a main body, a camera module, a communication module, and a behavior detection module. The main body has a hollow chamber. The camera module is pivotally mounted within the hollow chamber, and includes a first camera, a microphone, and a system-on-chip (SoC) connected to the first camera. The first camera is used to record images of a baby. The communication module is electrically connected to the SoC, where the SoC establishes a connection with a cloud server and a smart mobile device through the communication module. The cloud server includes an artificial intelligence model. The behavior detection module is electrically connected to the SoC, where the behavior detection module receives and analyzes the baby's movements and sounds in real time. When it detects an abnormal condition of the baby, the behavior detection module sends a message to the smart mobile device.

9 Claims, 8 Drawing Sheets

ARTIFICIAL INTELLIGENCE-BASED BABY MONITOR

BACKGROUND OF THE INVENTION

(a) Technical Field of the Invention

The present invention generally relates to baby monitors, and more particularly to a baby monitor that uses artificial intelligence to assess the baby's condition and immediately notifies caregivers when an abnormal condition is detected.

(b) Description of the Prior Art

Traditional caregiving involves caregivers staying by the care recipient's side around the clock to respond to emergencies. However, this approach requires substantial manpower and cost. As a result, relevant industries have developed monitors to address the shortcomings of conventional caregiving. These monitoring devices typically consist of a camera and a display unit. The camera captures the care recipient's image and transmits it to the display unit, allowing caregivers to observe the condition of the care recipient remotely, thus eliminating the need for constant physical presence. However, in practice, caregivers cannot continuously monitor the display unit. If the caregiver fails to notice an emergency situation (such as choking or shock), it could lead to an irreversible tragedy.

A conventional caregiving device, such as that disclosed in Taiwan Patent No. M274603, titled "Wireless Monitoring Device for Detecting Blanket Kicking and Smoke for Children," includes a signal sensor, a signal transceiver, and a monitor. The signal sensor is equipped with a thermal sensor and an infrared emitter that sends out a sensor signal. The signal transceiver has an infrared receiver that receives the sensor signal, a camera lens, and a radio transmitter that synchronously transmits both the sensor signal and the data captured by the camera. The monitor includes a radio receiver and a speaker, which not only displays the video data from the camera but also receives the sensor signals relayed by the transceiver. In operation, the signal sensor is placed on the care recipient (e.g., a child) to detect the surrounding temperature. If the child kicks off the blanket while sleeping, the thermal sensor detects the temperature drop and emits a signal, which is then relayed to the monitor, alerting the caregiver via the monitor's speaker. However, this sensor is prone to inaccuracies due to varying ambient temperatures or placement differences—for instance, if the sensor remains covered by the blanket even after it is kicked off, detection may fail or result in false alarms.

In summary, conventional caregiving devices mainly offer video transmission functions. Even those with features like blanket kicking and smoke detection still lack sufficient detection accuracy. Moreover, their functionality cannot cover all potential conditions of the care recipient, such as detecting when the recipient wakes up by opening its eyes, detecting body turning during sleep, detecting suffocation when the nose and mouth are covered by a blanket, or detecting when the recipient moves out of the camera's view. As a result, caregivers cannot fully rely on these devices and still need to watch the monitor for extended periods to handle emergencies. These devices not only fail to provide accurate alerts of abnormal conditions but also cannot reduce the caregiver's burden. These numerous shortcomings represent urgent issues that the industry must address.

SUMMARY OF THE INVENTION

To resolve the above shortcomings, the present invention discloses an artificial intelligence-based baby monitor, which includes a main body, a camera module, a communication module, and a behavior detection module. The main body has a hollow chamber. The camera module is pivotally mounted within the hollow chamber, and includes at least one first camera, at least one microphone, and a system-on-chip (SoC) connected to the at least one first camera. The at least one first camera is used to record images of a baby. The communication module is inside the main body and electrically connected to the SoC, where the SoC establishes a connection with a cloud server and a smart mobile device through the communication module. The cloud server includes an artificial intelligence model. The behavior detection module is electrically connected to the SoC, where the behavior detection module receives the baby's movements and sounds in real time and uses an algorithm of the SoC to analyze the movements and sounds. When it detects that the baby is uncovered, has spit up, has its face covered by a blanket, has rolled over into a prone position, or is crying, the behavior detection module sends at least one message to the smart mobile device.

Preferably, the artificial intelligence-based baby monitor further includes a remote sensing module electrically connected to the SoC. The remote sensing module includes at least one light-emitting unit and at least one second camera. The at least one light-emitting unit includes at least one infrared emitter and at least one visible light emitter. The at least one light-emitting unit illuminates the baby. The second camera continuously captures images of the baby. The images are transmitted to the cloud server, where they are processed by the artificial intelligence model to generate a physiological information. The physiological information is then sent back and output to the smart mobile device. The physiological information includes heart rate and blood pressure. The artificial intelligence model processes the images using remote photoplethysmography (rPPG) and facial recognition technology to obtain the physiological information. Each image includes the baby's face, chest, arms, and wrists.

Preferably, the artificial intelligence-based baby monitor further includes a body temperature detector coupled to the SoC. The body temperature detector detects the baby's body temperature that is integrated into the physiological information.

Preferably, the remote sensing module further includes a complementary metal-oxide-semiconductor (CMOS) connected to the second camera.

Preferably, the main body has a spherical shape and is placed on a base, which serves to support the main body.

Preferably, the base is mounted on an adjustable support arm, which is selectively configured on a baby crib.

Preferably, the artificial intelligence-based baby monitor further includes a display connected to and positioned above the main body. The display is electrically connected to the SoC and is used to show a facial expression.

Preferably, the artificial intelligence-based baby monitor further includes a speaker on the main body electrically connected to the SoC. When the SoC determines that the baby is uncovered, has spit up, has its face covered by a blanket, has rolled over into a prone position, or is crying, the speaker emits an alert sound.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
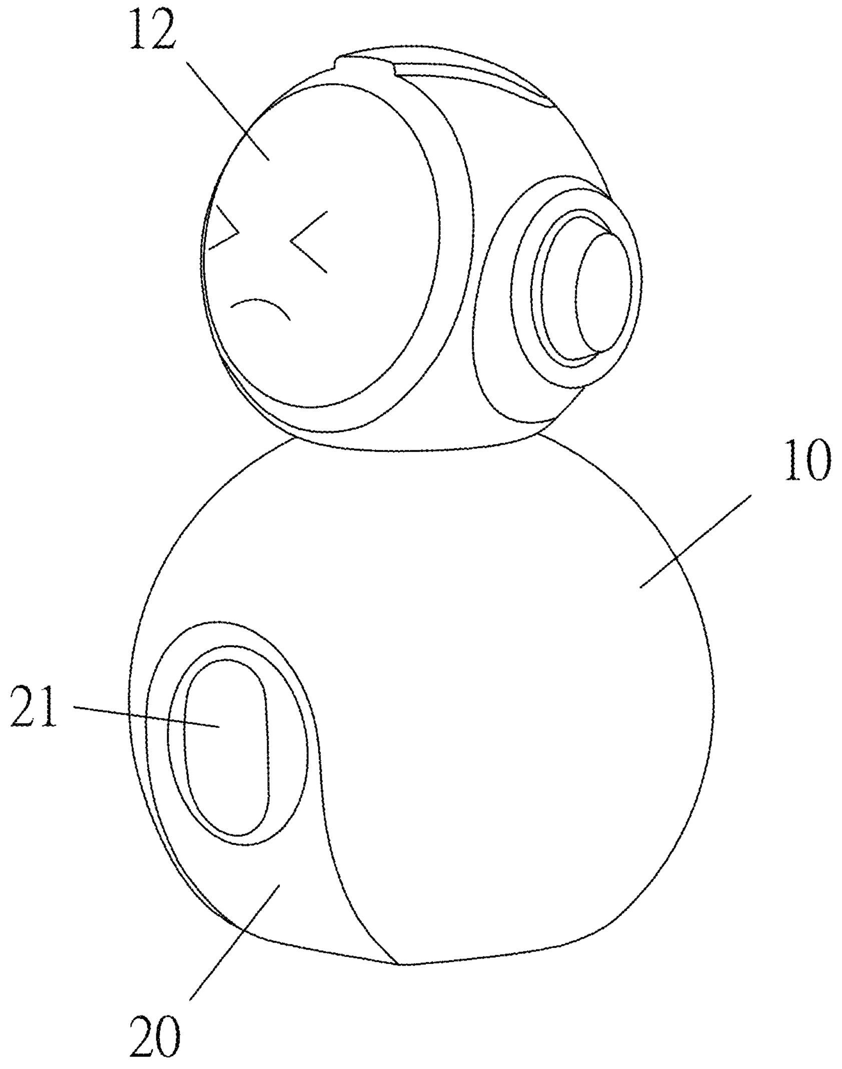
FIG. 1 is a perspective diagram showing a baby monitor according to an embodiment of the present invention.
Figure 2:
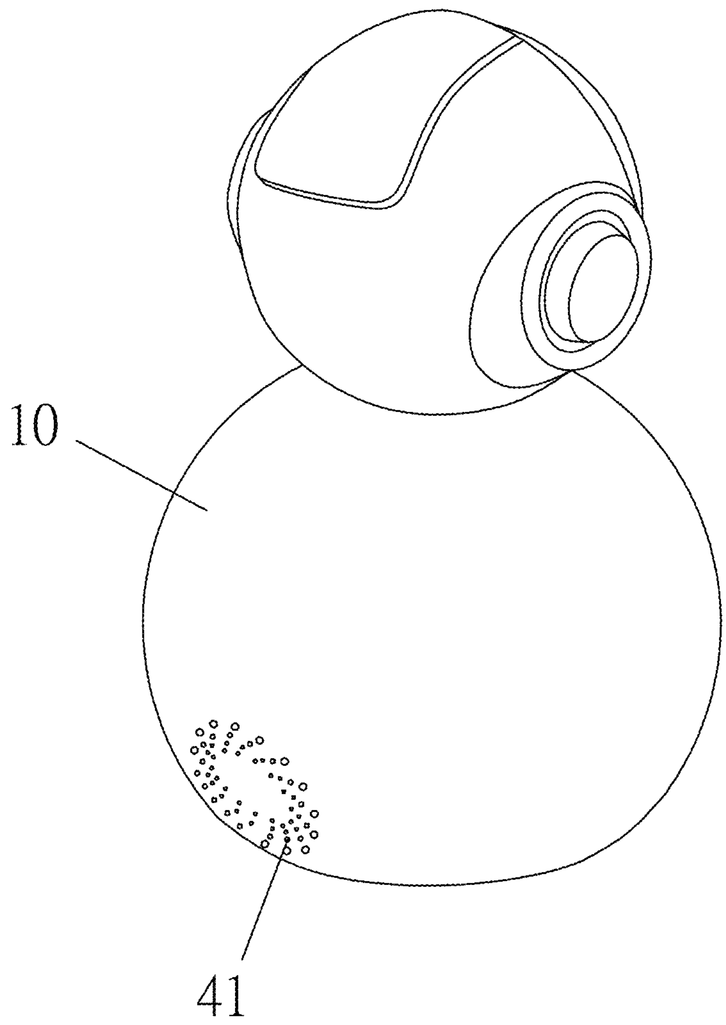
FIG. 2 is another perspective diagram showing the baby monitor of FIG. 1.

As shown in FIGS. 1 and 2, a baby monitor according to an embodiment of the present invention includes the following components.

A main body 10 has a hollow chamber.

A camera module 20, pivotally mounted within the hollow chamber, includes at least one first camera 21, at least one microphone, and a system-on-chip (SoC) 22 connected to the first camera 21. The first camera 21 is used to record images of a baby.

Figure 3:
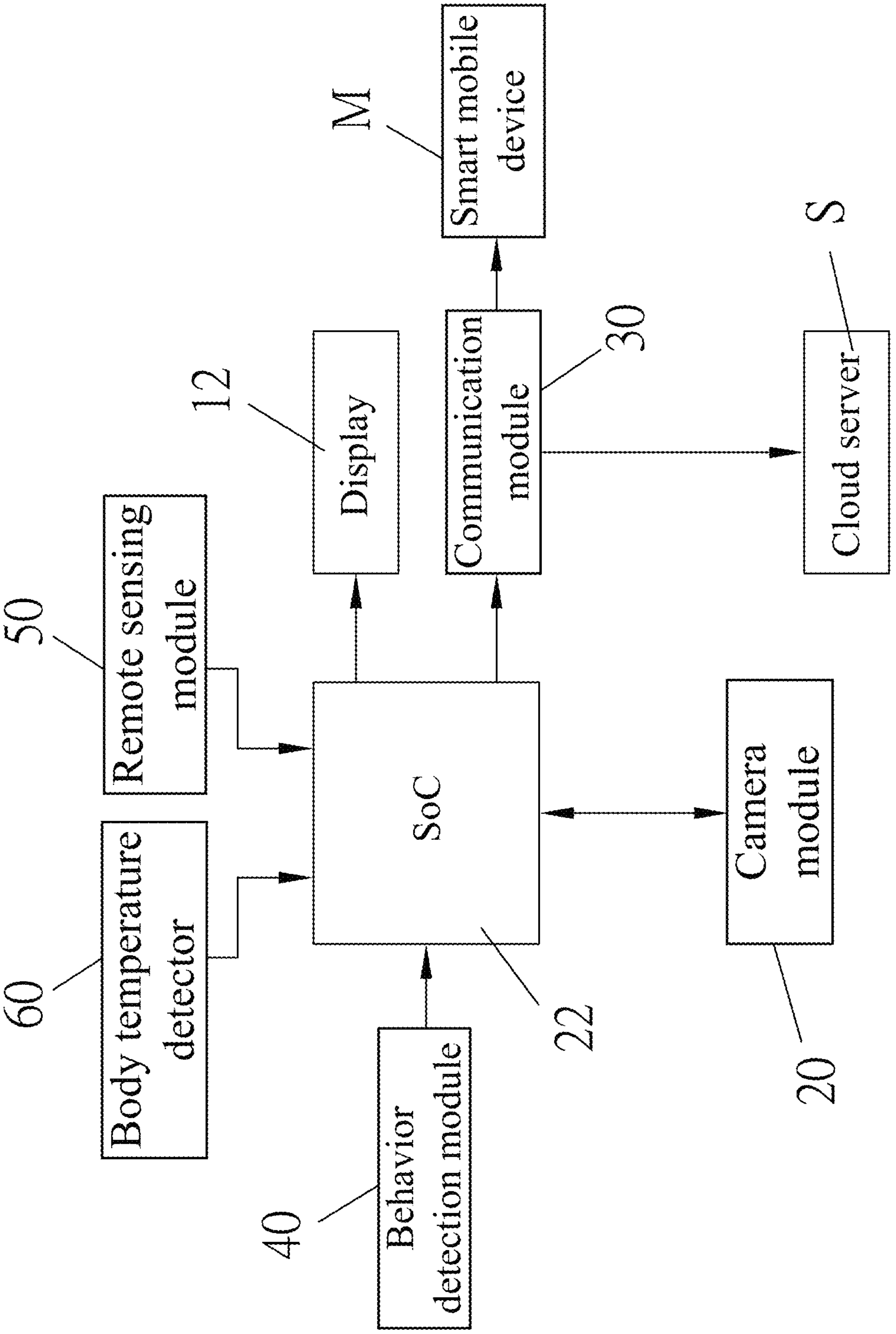
FIG. 3 is a functional block diagram of the baby monitor of FIG. 1.

As further shown in FIG. 3, a communication module 30 inside the main body 10 is electrically connected to the SoC 22 and establishes a connection with a cloud server S and a smart mobile device M through the communication module 30. The cloud server S includes an artificial intelligence model S1.

Figure 4:
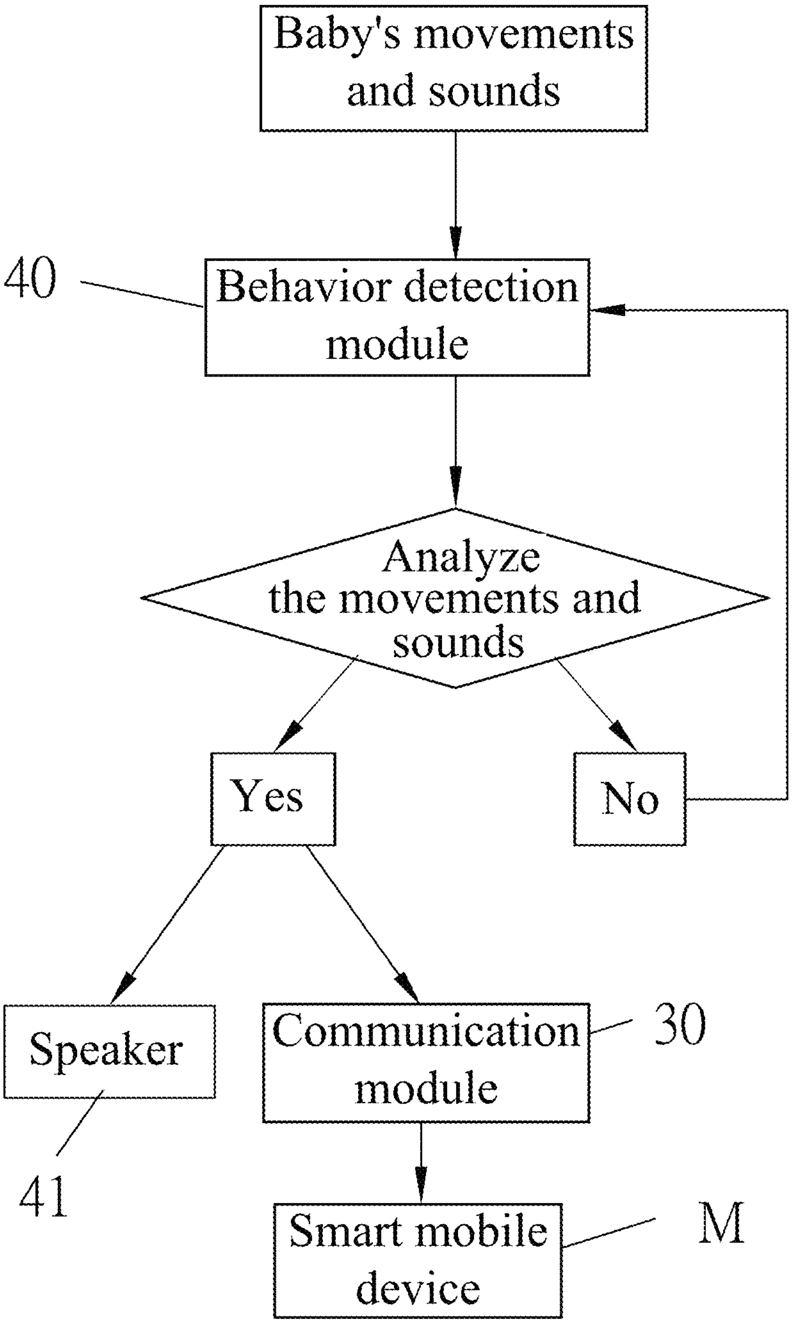
FIG. 4 is a flow diagram showing the detection process of the behavior detection module shown in FIG. 3.

As shown in FIGS. 3 and 4, a behavior detection module 40 is electrically connected to the SoC 22. The behavior detection module 40 receives the baby's movements and sounds in real time and uses an algorithm of the SoC 22 to analyze the movements and sounds. When it detects that the baby is uncovered, has spit up, has its face covered by a blanket, has rolled over into a prone position, or is crying, the module sends at least one message to the smart mobile device M.

Additionally, the SoC 22 is electrically connected to a speaker 41. When the algorithm of the SoC 22 determines that the baby is uncovered, has spit up, has its face covered by a blanket, has rolled over into a prone position, or is crying, the speaker 41 emits an alert sound.

Figure 5:
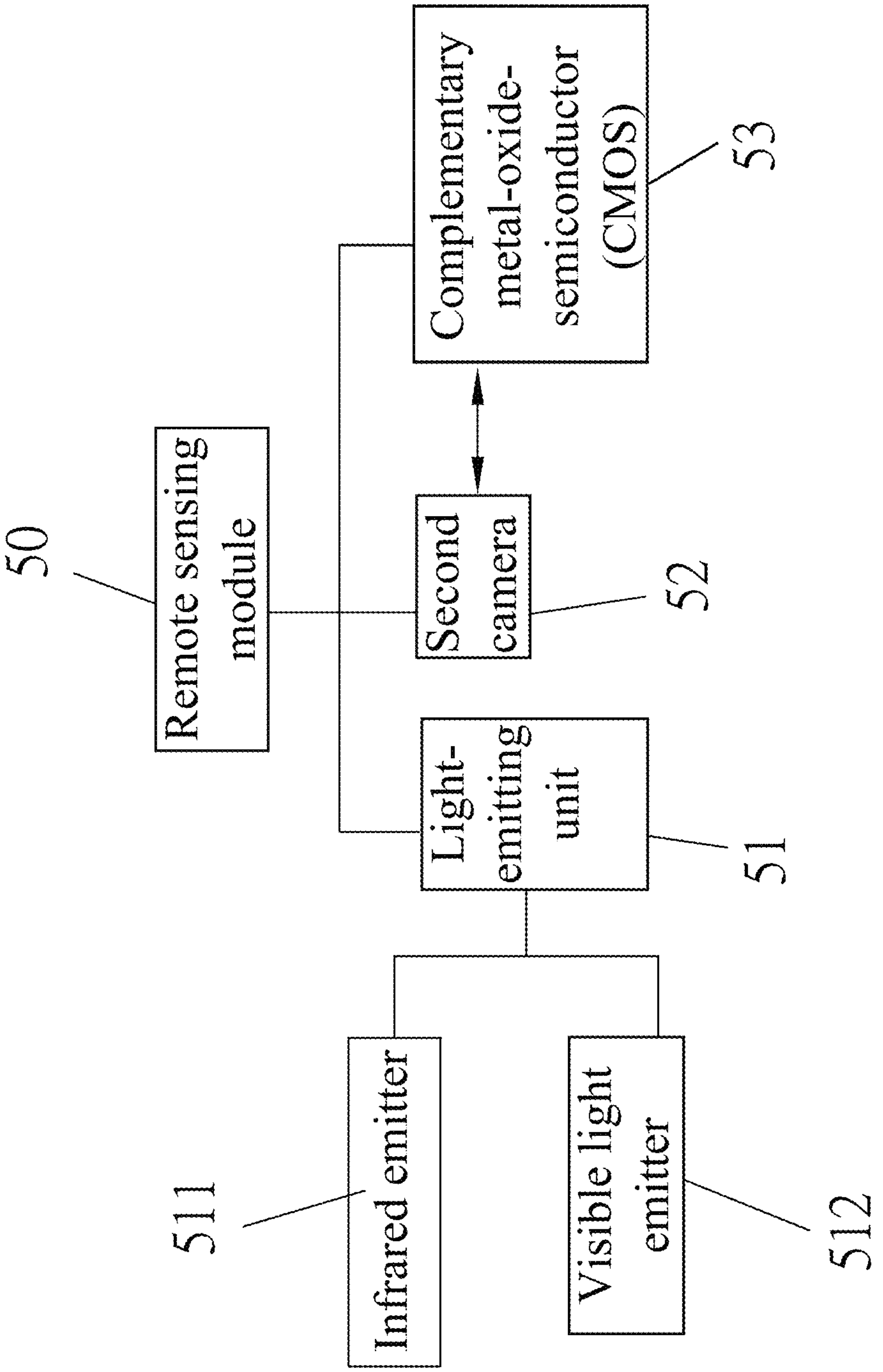
FIG. 5 is a functional block diagram of the remote sensing module shown in FIG. 3.
Figure 6:
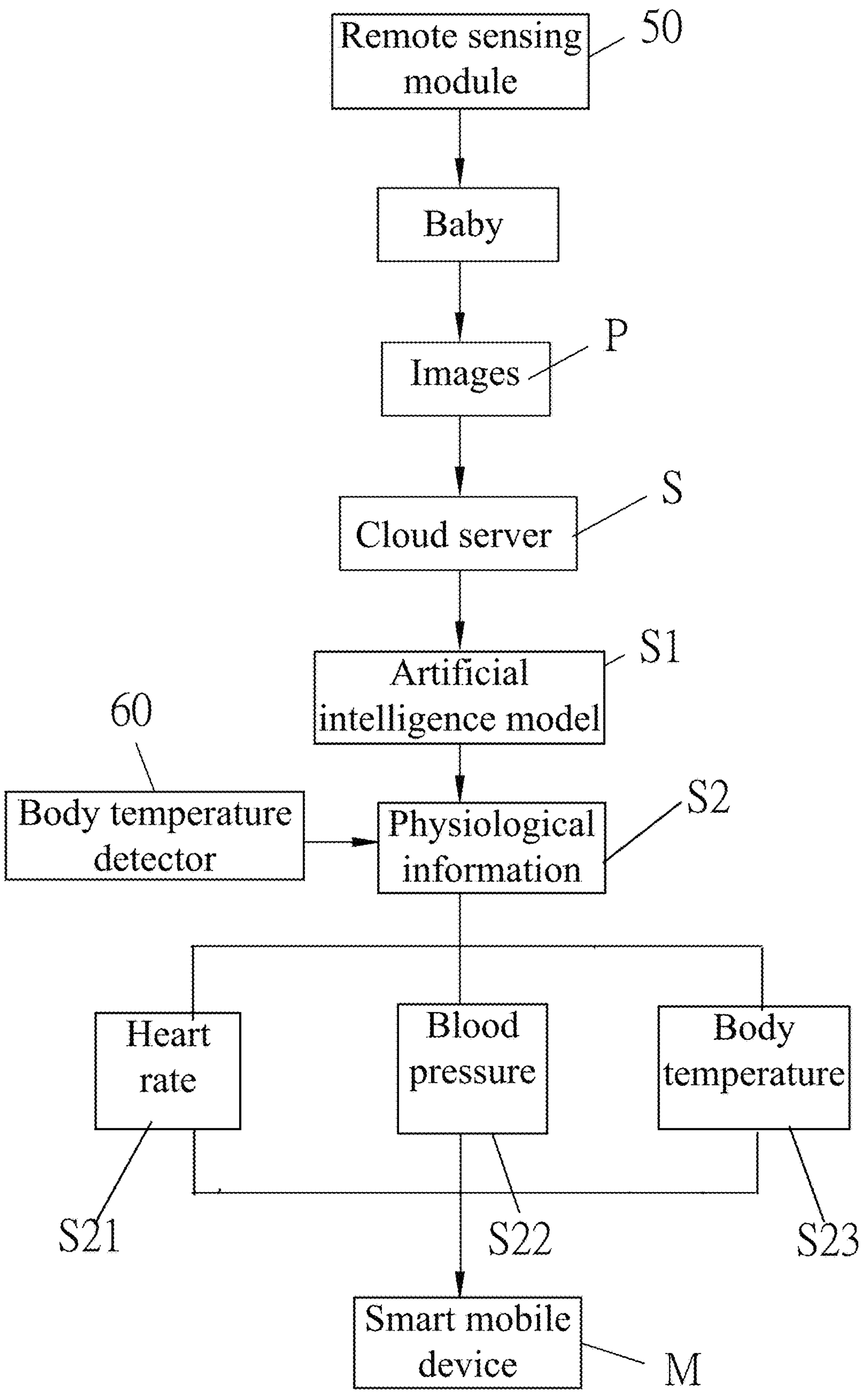
FIG. 6 is a schematic diagram showing the operation of the remote sensing module of FIG. 5.
Figure 7:
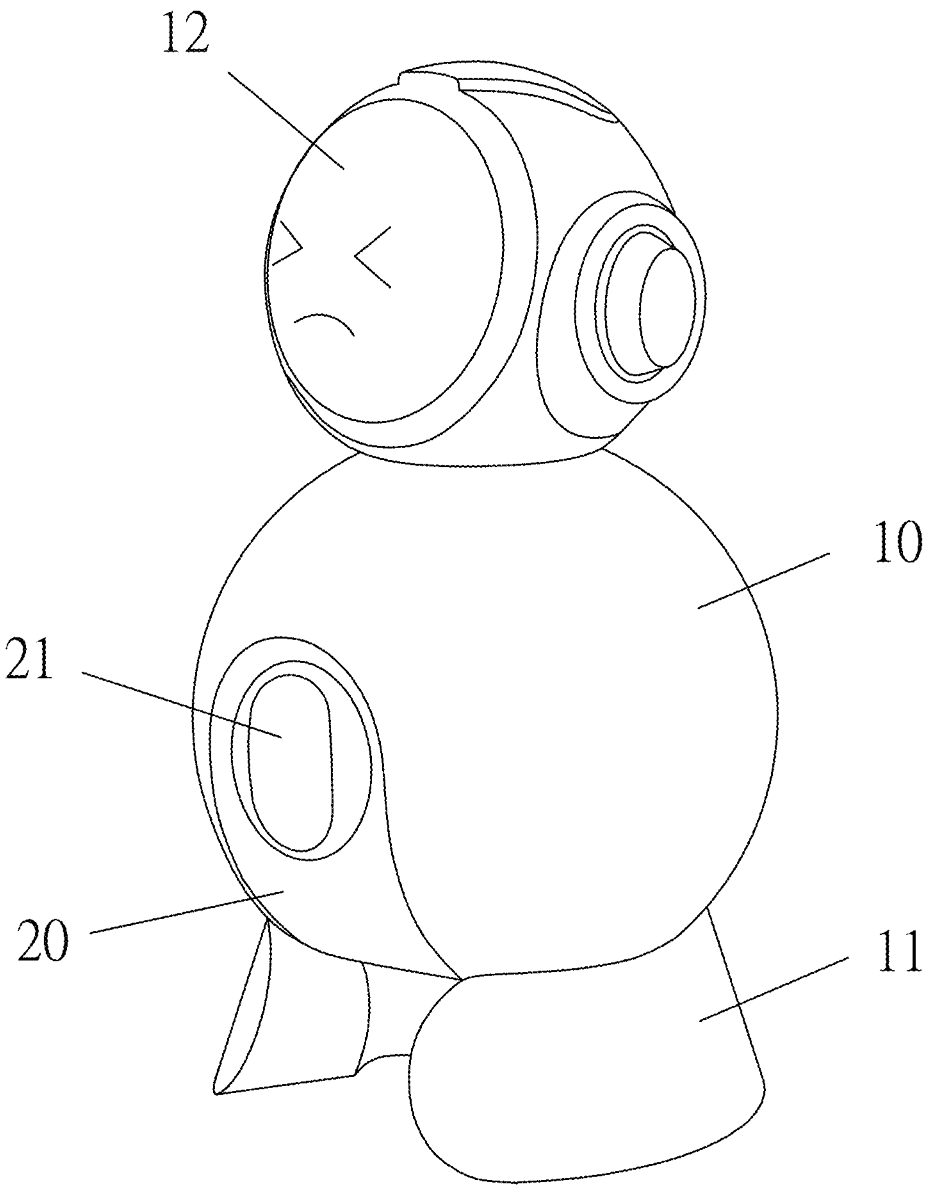
FIG. 7 is a perspective diagram showing the baby monitor of FIG. 1 mounted on a base.
Figure 8:
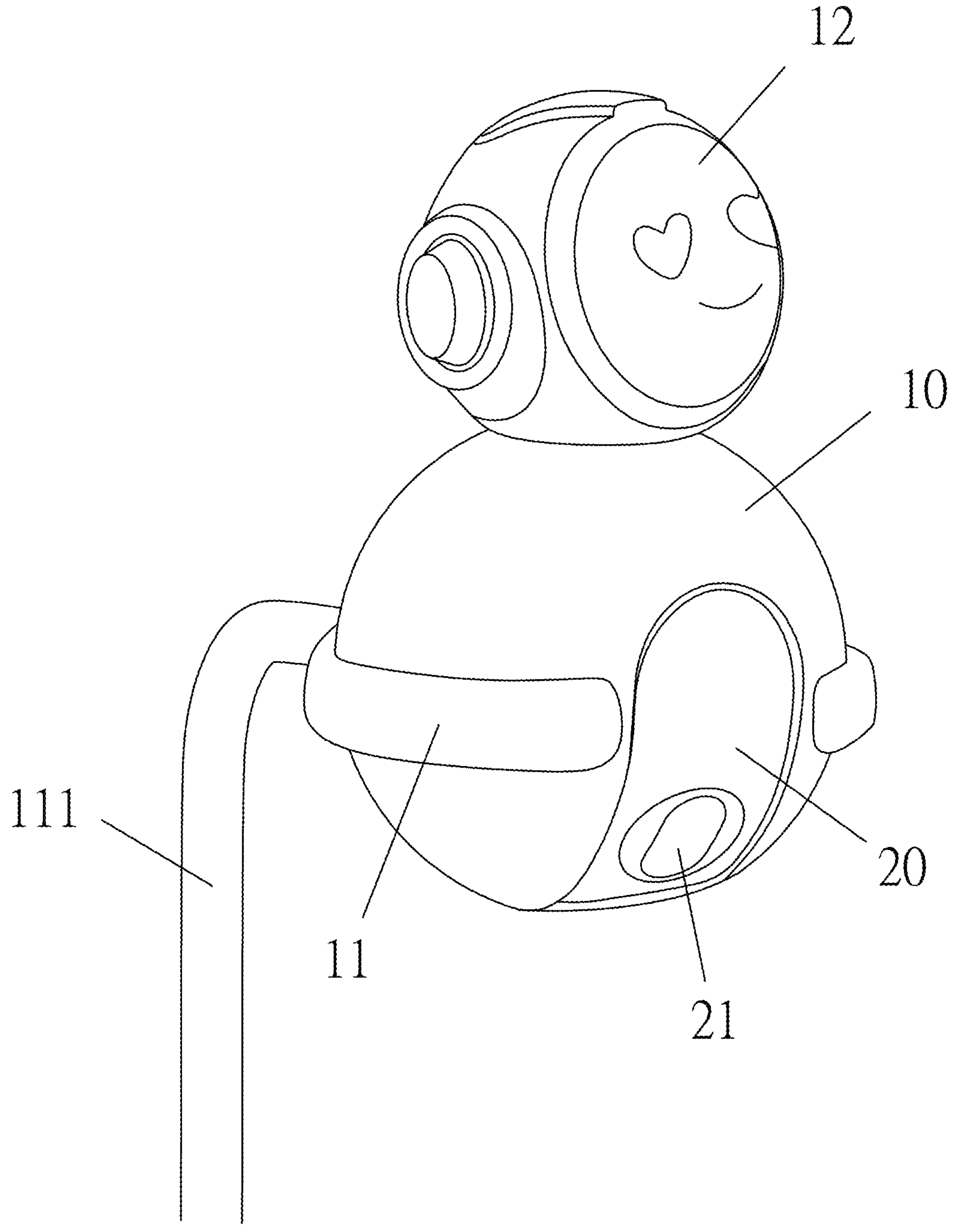
FIG. 8 is a perspective diagram showing the baby monitor and the base of FIG. 7 mounted on an adjustable support arm.

As shown in FIGS. 3, 5, and 6, The SoC 22 is electrically connected to a remote sensing module 50, which includes at least one light-emitting unit 51, at least one second camera 52, and a complementary metal-oxide-semiconductor (CMOS) 53 connected to the second camera 52. The light-emitting unit 51 includes at least one infrared emitter 511 and at least one visible light emitter 512. The light-emitting unit 51 illuminates the baby, and the second camera 52 continuously captures multiple images P. These images P are transmitted to the cloud server S, where they are processed by the artificial intelligence model S1 to generate physiological information S2. This physiological information S2 is then sent back and output to the smart mobile device M. The physiological information S2 includes heart rate S21 and blood pressure S22. The artificial intelligence model S1 uses remote photoplethysmography (rPPG) and facial recognition technology to analyze the images P in order to obtain the physiological information S2. The images P include the baby's face, chest, arms, and wrists.

The SoC 22 is further coupled to a body temperature detector 60, which detects the baby's body temperature S23 that is integrated into the physiological information S2.

As shown in FIGS. 1, 2, 7, and 8, in the present embodiment, the main body 10 has a spherical shape and is placed on a base 11, which serves to support the main body 10. The base 11 can be mounted on an adjustable support arm 111, which can be configured on a baby crib, though this is not limiting. The camera module 20 is pivotable, allowing users to adjust it to the optimal shooting angle.

The main body 10 is connected to a display 12, which is positioned above the main body 10. The display 12 is electrically connected to the SoC 22 and is used to show facial expressions, thereby adding an element of fun to attract the baby's attention.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An artificial intelligence-based baby monitor, comprising:

a main body having a hollow chamber;

a camera module, pivotally mounted within the hollow chamber, comprising at least one first camera, at least one microphone, and a system-on-chip (SoC) connected to the at least one first camera, where the at least one first camera is used to record images of a baby;

a communication module inside the main body electrically connected to the SoC, where the SoC establishing a connection with a cloud server and a smart mobile device through the communication module, and the cloud server comprises an artificial intelligence model; and a behavior detection module electrically connected to the SoC, where the behavior detection module receives the baby's movements and sounds in real time and uses an algorithm of the SoC to analyze the movements and sounds, and, when it detects that the baby is uncovered, has spit up, has its face covered by a blanket, has rolled over into a prone position, or is crying, the behavior detection module sends at least one message to the smart mobile device.

2. The artificial intelligence-based baby monitor as claimed in claim 1, further comprising a remote sensing module electrically connected to the SoC, wherein the remote sensing module comprises at least one light-emitting unit, and at least one second camera; the at least one light-emitting unit comprises at least one infrared emitter and at least one visible light emitter; the at least one light-emitting unit illuminates the baby; the at least one second camera continuously captures images of the baby; the images are transmitted to the cloud server, where they are processed by the artificial intelligence model to generate a physiological information; the physiological information is then sent back and output to the smart mobile device; the physiological information comprises heart rate and blood pressure; the artificial intelligence model processes the images using remote photoplethysmography (rPPG) and facial recognition technology to obtain the physiological information; and each image comprises the baby's face, chest, arms, and wrists.

3. The artificial intelligence-based baby monitor as claimed in claim 2, further comprising a body temperature detector coupled to the SoC; wherein the body temperature detector detects the baby's body temperature that is integrated into the physiological information.

4. The artificial intelligence-based baby monitor as claimed in claim 2, wherein the remote sensing module further comprises a complementary metal-oxide-semiconductor (CMOS) connected to the at least one second camera.

5. The artificial intelligence-based baby monitor as claimed in claim 1, wherein the main body has a spherical shape and is placed on a base, which serves to support the main body.

6. The artificial intelligence-based baby monitor as claimed in claim 5, wherein the base is mounted on an adjustable support arm, which is selectively configured on a baby crib.

7. The artificial intelligence-based baby monitor as claimed in claim 1, further comprising a display connected to and positioned above the main body; wherein the display is electrically connected to the SoC and is used to show a facial expression.

8. The artificial intelligence-based baby monitor as claimed in claim 5, further comprising a display connected to and positioned above the main body; wherein the display is electrically connected to the SoC and is used to show a facial expression.

9. The artificial intelligence-based baby monitor as claimed in claim 1, further comprising a speaker on the main body electrically connected to the SoC; wherein, when the SoC determines that the baby is uncovered, has spit up, has its face covered by a blanket, has rolled over into a prone position, or is crying, the speaker emits an alert sound.

* * * * *